Patented June 24, 1952

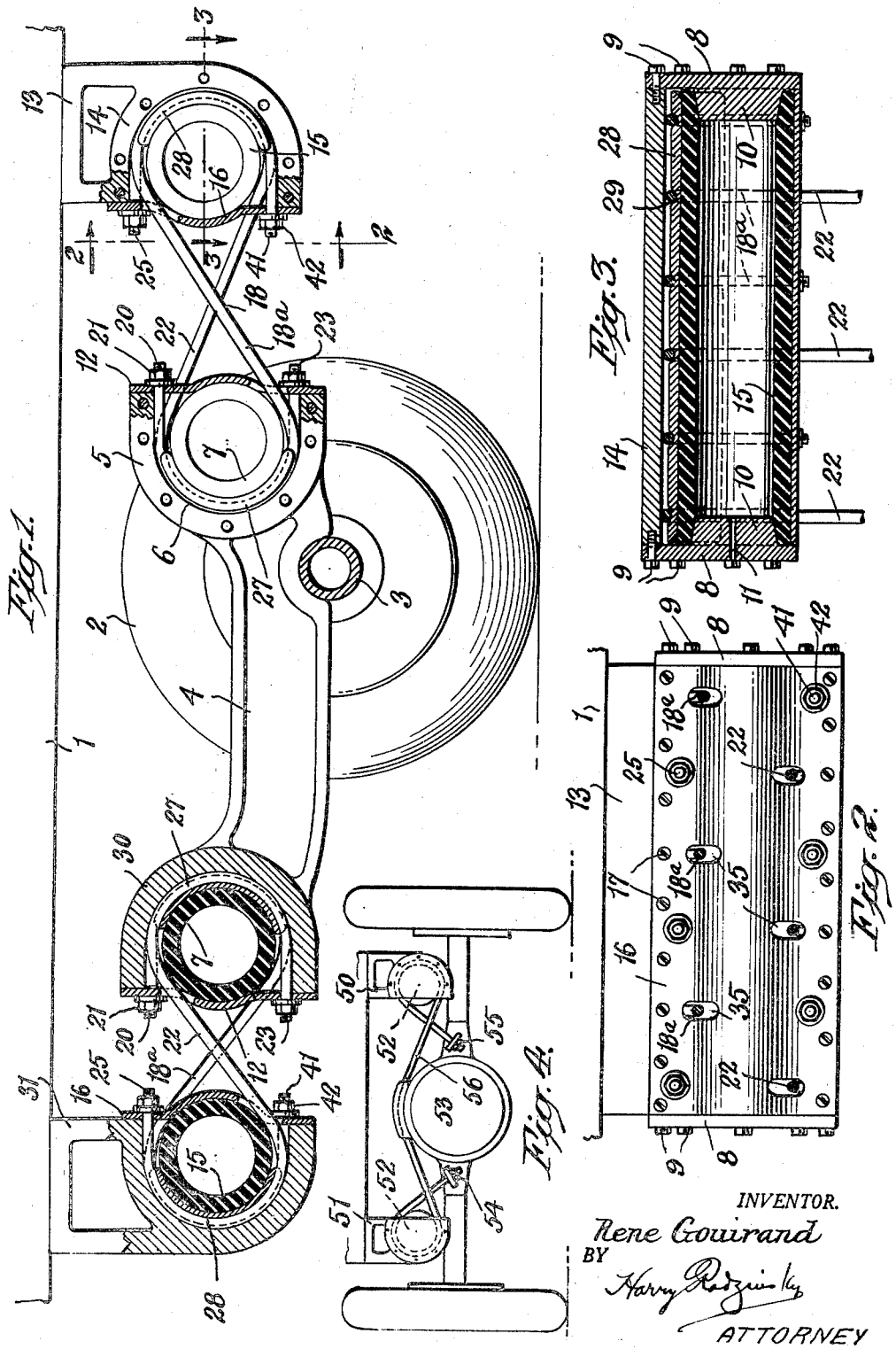

2,601,515

UNITED STATES PATENT OFFICE 2,601,515

PNEUMATIC SUSPENSION DEVICE FOR VEHICLES

Rene Gouirand, New York, N. Y.

Application June 8, 1951, Serial No. 230,519

7 Claims. (Cl. 267—65)

This invention relates to the pneumatic suspension of vehicle bodies, wherein air-inflated cushions are interposed between the axles and chassis frame or body of a vehicle and thereby serve to resiliently support the load and to absorb road shocks. Examples of pneumatic suspensions in the same general class as that to which the present invention relates, will be found in my Patents Nos. 1,555,199 dated September 29, 1925; No. 2,042,596 dated June 2, 1936, and No. 2,488,288 dated November 15, 1949.

In said patents and in other prior patents, the suspension is arranged in a manner to rest the body or chassis frame on cushions so that the cushions act to support the vehicle body in a manner somewhat similar to that in which the support is effected in cases where elliptic springs are employed.

The present invention contemplates the provision of a simplified construction, wherein the chassis frame or body of the vehicle is coupled to the running gear or axle frame by means of flexible cables which extend around cylindrical air cushions, the cables crossing one another and adapted to encircle the cushions in a manner to compress the cushions under road shock.

The invention has for one of its objects, a simplified mounting for the cushions, and a novel manner in which the cables are extended around the cushions and are connected to the running gear and chassis frame, and in other novel features to be herein fully set forth.

In the accompanying drawing, wherein two embodiments of the invention are disclosed, Fig. 1 is a vertical and longitudinal sectional view through portions of a vehicle, such as a trailer, showing the manner in which the axle frame is coupled to the body or chassis frame by the improved pneumatic suspension means;

Fig. 2 is a sectional view taken on the line 2—2 of Fig. 1, looking in the direction of the arrows;

Fig. 3 is a sectional view taken on the line 3—3 of Fig. 1, looking in the direction of the arrows, and Fig. 4 is a rear view of the lower portion of a motor vehicle, showing the suspension means applied thereto.

The improved pneumatic suspension means, while herein shown as applied to automotive vehicles, is adapted for many uses, including railway coaches, freight cars, airplanes and many other vehicles. In Fig. 1 is shown the manner in which the suspension means may be applied to an automobile, truck, trailer or the like, some of the driving elements of such a vehicle being omitted in order not to obscure the features of the invention.

At 1 is shown a portion of the body or chassis frame of the vehicle, and 2 indicates one of the wheels, and 3 the axle therefor. A cantilever frame 4 is shown as mounted on and attached to the axle housing. At one of its ends, the frame 4 is provided with a yoke-shaped housing 5 defining a channel or chamber 6 containing an elongated, cylindrical air-filled cushion 7. Each of the ends of the chamber 6 is closed by a plate 8 secured to the yoke-ends by the screws 9, and each plate carries a closure plug 10 on its inner face. These plugs 10 fit into the opposite ends of the tube 7 and provide an air tight seal thereat so that said tube then becomes a closed, air-inflated cylinder.

An opening 11 can be provided through one of the end plates 9 and the plug 10 thereon, and a tire valve may be located in said opening to enable the cushion to be inflated whenever required to maintain the proper air pressure within it. The open side of the yoke 5 is closed by a plate 12.

Secured to and extending downwardly from the under side of the chassis frame 1 is a bracket 13 which has a yoke portion 14 generally conforming in shape to the housing 5 on the cantilever frame 4. This yoke portion 14 contains an air cushion 15 similar to the cushion 7 in the yoke 5. The ends of the yoke 14 are closed by end plates 8, and the ends of the cushion 15 are closed by plugs 10 similar to those previously described in connection with the cushion 5.

The open side of the yoke 14 is closed by a plate 16 secured to the yoke 14 by the screws 17. Similar screws secure the closure plate 12 to the housing 5. Extending between the two air cushions 7 and 15 and partly encircling each of the cushions, is a plurality of flexible cables 18 which are substantially S-shaped in formation. These cables are arranged in the staggered or alternating formation shown in Fig. 2. The cables indicated at 18a in Figs. 1 and 2 each extend partly around the air cushion 7 and has an end 20 anchored by the nut 21 above the cushion 7. Said cables 18a each extend over the top of the air cushion 15 and each have an opposite end 41 anchored by the nut 42. The next cable shown at 22, or that behind the cable 18a as viewed in Fig. 1, has an end 23 located below the air cushion 7 and its opposite end 25 located above the air cushion 15. This alternating arrangement of the cables is carried out across the length of the cushions 7 and 15 as will be apparent from Fig. 2.

The portions of the several cables which extend around the cushions 7 and 15 are maintained from direct contact with these cushions by means of arcuate metal plates 27 and 28 which respectively extend around a part of each of the cushions 7 and 15 respectively within the chambers defined by the yokes 5 and 14. The plates 27 and 28 may be grooved as indicated at 29 to receive the cables.

The construction thus far described is found at one end of the cantilever frame 4, and at the opposite end of said frame is a yoke 30 which is similar in shape and construction to that shown at 5. A bracket 31 carried by the chassis frame is similar to that shown at 13 and the air cushions and cooperating elements at this end of the suspension are similar in all respects to those shown at the opposite end and thus similar reference numerals have been applied to the same.

From the foregoing, the operation of the improved suspension means will be readily understood. Any shocks imparted to the wheels will be taken up by the air cushions through pressure imposed upon the same by the cables and plates 27, 28 over which said cables extend. For example, assuming that the wheels will ride over an obstruction in the road, causing the wheels to be elevated. This will exert a pull on cable 18a on the right side of the wheel of Fig. 1 toward the left, causing a compression of the cushion 7, while at the same time a pull will be exerted on cable 22 toward the right on the same side of the wheel, causing a compression of the cushion 15. The cables on the opposite side of the wheel will move in reverse directions. The reversal of this occurs when the wheels drop into a depression or hole in the road, the crossed and alternating cables serving to distribute the force of the shock over the several air cushions through the cables. The cables extend through openings 35 provided in the plates 12 and 16, as clearly seen in Fig. 2.

In Fig. 4 is illustratively shown a shock-absorbing embodying the construction heretofore described. In this embodiment, the opposite sides of the chassis frame carry the brackets 50 and 51, each of which contains an air cushion 52 of the construction described in relation to the brackets shown at 16 in the embodiment of Fig. 1. Cables 56 extend around the cushions 52 and over the top of the differential housing 53. The opposite ends of the cables are anchored at the points indicated at 54 and 55 on the axle housing. This structure acts to control side sway and is an inexpensive construction for light vehicles.

The foregoing detailed description sets forth the invention in its preferred practical form, but the invention is to be understood as fully commensurate with the appended claims.

What I claim is:

1. A vehicle comprising a chassis frame, a bracket carried thereby, a cylindrical air cushion carried by said bracket, a wheeled axle mounted below the chassis frame, a bracket carried by said axle, an air cushion carried by the axle bracket, and flexible cables secured at one end in the axle bracket and secured at the opposite end in the chassis-frame bracket, each of the cables partly encircling the air cushions in both brackets.

2. A vehicle comprising a chassis frame, a wheeled axle mounted below the same, a cylindrical air cushion carried by the axle and a similar air cushion carried by the chassis frame, and cables connecting the axle and chassis frame, said cables partly encircling both air cushions.

3. A vehicle comprising a chassis frame, a bracket carried thereby, said bracket defining a cylindrical chamber, a cylindrical air-inflated cushion contained in and closely fitting the interior of said chamber, a wheeled axle having a bracket defining a cylindrical chamber, and air-inflated cushion contained in the latter chamber, a plurality of crossed flexible cables extending between the two brackets and extending into said brackets and partly encircling the two air cushions, each cable being anchored at one end to one of the brackets and at its other end to the other bracket.

4. A vehicle comprising a chassis frame, a pair of brackets secured thereto in spaced relation, an air-cushion in each bracket, a wheeled axle below the chassis frame and located between the brackets, a frame on the axle provided at each of its ends with a cushion-housing, each of said housings containing an air-inflated cushion, flexible cables attached at one end to the brackets and attached at their other ends to the housings, said cables partly encircling the air cushions in the brackets and partly encircling the air cushions in the housings.

5. A vehicle comprising a chassis frame having a bracket provided with an air-cushion within it, a wheeled axle carrying a housing containing an air cushion, a plurality of crossed flexible cables partly encircling the cushion in the housing and having an end attached to the housing above the said cushion, said cables having their other ends partly encircling the cushion in the bracket and having said latter ends attached to the bracket above the said cushion, a second group of cables alternating with those of the first group, the cables in the second group having one end attached to the housing below the cushion therein and having their other ends attached to the bracket below the cushion in said bracket.

6. A vehicle as provided in claim 5 wherein there is provided in the bracket and in the housing an arcuate plate interposed between the cables and the cushions.

7. A vehicle comprising a chassis frame having a bracket provided with an air-cushion within it, a wheeled axle carrying a housing containing an air cushion, a plurality of crossed flexible cables partly encircling the cushion in the housing and having an end attached to the housing above the said cushion, said cables having their other ends partly encircling the cushion in the bracket and having said latter ends attached to the bracket above the said cushion, a second group of cables alternating with those of the first group, the cables in the second group having one end attached to the housing below the cushion therein and having their other ends attached to the bracket below the cushion in said bracket, and an arcuate plate in the housing and in the bracket located between parts of the cables and the cushions.

RENE GOUIRAND.

REFERENCES CITED

The following references are of record in the file of this patent:

UNITED STATES PATENTS

| Number | Name | Date |
| --- | --- | --- |
| 2,180,860 | Brown | Nov. 21, 1939 |